United States Patent
Yu et al.

(10) Patent No.: US 10,153,699 B2
(45) Date of Patent: Dec. 11, 2018

(54) CONTROL METHOD FOR POWER TRANSMITTER, POWER TRANSMITTER AND NONCONTACT POWER TRANSFER APPARATUS

(71) Applicant: NINGBO WEIE ELECTRONICS TECHNOLOGY LTD., Ningbo, Zhejiang (CN)

(72) Inventors: Feng Yu, Zhejiang (CN); Weiyi Feng, Zhejiang (CN)

(73) Assignee: NINGBO WEIE ELECTRONICS TECHNOLOGY LTD., Ningbo, Zhejiang (CN)

(*) Notice: Subject to any disclaimer, the term of this patent is extended or adjusted under 35 U.S.C. 154(b) by 0 days.

(21) Appl. No.: 15/637,509

(22) Filed: Jun. 29, 2017

(65) Prior Publication Data

US 2018/0006567 A1    Jan. 4, 2018

(30) Foreign Application Priority Data

Jul. 1, 2016 (CN) .......................... 2016 1 0526379

(51) Int. Cl.
*H02M 3/28* (2006.01)
*G01V 3/10* (2006.01)
*H02J 5/00* (2016.01)
*H02J 7/00* (2006.01)
*H02J 7/02* (2016.01)
*H04B 1/3883* (2015.01)
(Continued)

(52) U.S. Cl.
CPC .............. *H02M 3/28* (2013.01); *G01V 3/10* (2013.01); *H02J 5/005* (2013.01); *H02J 7/0044* (2013.01); *H02J 7/025* (2013.01); *H02J 50/12* (2016.02); *H02J 50/90* (2016.02); *H04B 1/3883* (2013.01); *H04B 5/0037* (2013.01); *H04B 5/0081* (2013.01); *H04B 5/0087* (2013.01)

(58) Field of Classification Search
CPC .. H04B 1/3883; H04B 5/0037; H04B 5/0081; H04B 5/0087; H02J 5/005; H02J 7/0044; H02J 7/025; H02J 50/12; H02J 50/90; H02M 3/28; G01V 3/10
USPC ....................................................... 455/41.1
See application file for complete search history.

(56) References Cited

U.S. PATENT DOCUMENTS

| 6,229,720 B1* | 5/2001 | Noma | H02M 7/537 310/318 |
| 2015/0349541 A1* | 12/2015 | Yamamoto | G01V 3/10 307/104 |

FOREIGN PATENT DOCUMENTS

| CN | 104009555 A | 8/2014 |
| CN | 104037956 A | 9/2014 |

(Continued)

*Primary Examiner* — Eugene Yun
(74) *Attorney, Agent, or Firm* — U.S. Fairsky LLP; Yue (Robert) Xu

(57) ABSTRACT

A control method for a power transmitter, a power transmitter and a noncontact power transfer apparatus are disclosed. An inverter in the power transmitter is controlled to be intermittently input a voltage in the standby mode, and the input voltage of the inverter is controlled to show a gradually increasing or gradually decreasing trend when there is a voltage value input in the standby state. According to the control method for the power transmitter, the power transmitter and the noncontact power transfer apparatus of the present disclosure, it can achieve smooth transition from the standby state to the normal state, and the standby efficiency and the normal operation efficiency can both be improved.

20 Claims, 5 Drawing Sheets

(51) Int. Cl.
   *H04B 5/00*   (2006.01)
   *H02J 50/12*  (2016.01)
   *H02J 50/90*  (2016.01)

(56) References Cited

FOREIGN PATENT DOCUMENTS

| | | |
|---|---|---|
| CN | 104539061 A | 4/2015 |
| CN | 204334131 U | 5/2015 |
| CN | 104682583 A | 6/2015 |
| CN | 104701999 A | 6/2015 |
| CN | 105098704 A | 11/2015 |
| CN | 105098844 A | 11/2015 |
| CN | 204809833 U | 11/2015 |
| CN | 204809885 U | 11/2015 |
| CN | 204809996 U | 11/2015 |
| CN | 105119391 A | 12/2015 |
| CN | 105186705 A | 12/2015 |
| CN | 204858755 U | 12/2015 |
| CN | 105391192 A | 3/2016 |
| CN | 205141847 U | 4/2016 |

* cited by examiner

CONTROL METHOD FOR POWER TRANSMITTER, POWER TRANSMITTER AND NONCONTACT POWER TRANSFER APPARATUS

CLAIM OF PRIORITY AND CROSS-REFERENCE TO RELATED APPLICATION(S)

This application claims the benefit of Chinese Patent Application No. 201610526379.9, filed on Jul. 1, 2016, which is incorporated herein by reference in its entirety.

BACKGROUND OF THE INVENTION

1. Field of the Invention

The present disclosure relates to the field of wireless power transmission, and more particularly to a control method for a power transmitter, a power transmitter and a noncontact power transfer apparatus.

2. Description of the Related Art

A magnetic resonance noncontact power transfer apparatus generally includes a power transmitter and a power receiver, as shown in FIG. 1. The power transmitter includes a DC-DC converter, an inverter, a primary-side resonant capacitor Cs and a primary-side transmitting coil Ls and the connections there between are as shown in FIG. 1. The power receiver includes a secondary-side resonant capacitor Cd and a secondary-side receiving coil Ld. As can be appreciated by those skilled in the art, the power transmitter may further comprise an impedance matching circuit, and the power receiver may further comprise other parts such as a rectifying circuit, a DC-DC converter, which are not shown in FIG. 1. The power transmitter resonates through the primary-side resonant capacitor Cs and the primary-side transmitting coil Ls to generate a high-frequency spatial magnetic field, and the power receiver obtains the energy by coupling to the high frequency spatial magnetic field.

In general, when the power transmitter detects that a power receiver is placed in the effective charging area thereof (i.e., detects a receiving load), the power transmitter is required to be activated immediately to enter into normal power transmission state so as to power the electronic equipment in the power receiver. When no power receiver is detected in the effective charging area of the power transmitter, the power transmitter is required to enter into the standby state, which can reduce loss and improve the standby efficiency.

Usually, in the standby state, the DC-DC converter outputs a voltage with a certain value, and the inverter in the power transmitter operates in a hiccup mode, i.e., works in a manner of resting for a period of time after operating for a period of time, so as to reduce standby loss of the power transmitter. The power transmitter starts to enter into a continuous operation state when a power receiver is detected in the effective charging range thereof.

However, the scheme has the following disadvantages: the value of the output voltage of the DC-DC converter cannot be set too small in order to meet the power demand of the load under different conditions such as the power demand when the coupling position is not good. While on the other hand, in order to improve the efficiency of the power receiver, the Schottky diode in the rectifier circuit and the switching device in the DC-DC converter and so on are often configured as low voltage withstanding devices. For safe and reliable operation of the low voltage withstanding devices, an overvoltage protection circuit is usually arranged in the power receiver. Therefore, if the power receiver enters into the effective charging area of the power transmitting coil and the coupling position is good, the power receiver then will obtain a large amount of energy and the overvoltage protection circuit may be kept in an overvoltage protection state, which renders the system fail to operate properly.

BRIEF DESCRIPTION OF THE INVENTION

In view of the above, the present disclosure proposes a control method for a power transmitter, a power transmitting terminal and a noncontact power transfer apparatus, wherein the input voltage of the inverter in the standby mode is set to be changed in a certain trend to make the system operate stably and normally.

According to a first aspect of present disclosed embodiments, it provides a control method for a power transmitter, the control method comprising: inputting an input voltage with a predetermined value to an inverter in the power transmitter when a receiving load is detected; and intermittently inputting a voltage to the inverter in each duty cycle when no receiving load is detected, and controlling the input voltage of the inverter to show a gradually increasing or gradually decreasing trend during the period when there is a voltage input to the inverter.

According to a second aspect of present disclosed embodiments, it provides a power transmitter comprising: an inverter; and a control circuit for detecting a receiving load, wherein the control circuit controls to input an input voltage with a predetermined value to the inverter when a receiving load is detected; and the control circuit controls to intermittently input a voltage to the inverter in each duty cycle when no receiving load is detected, and controls the input voltage of the inverter to show a gradually increasing or gradually decreasing trend during the period when there is a voltage input to the inverter.

According to a third aspect of the present disclosed embodiments, it provides a noncontact power transfer apparatus comprising: a power transmitter comprising: an inverter; and a control circuit for detecting a receiving load, wherein the control circuit controls to input an input voltage with a predetermined value to the inverter when a receiving load is detected; the control circuit controls to intermittently input a voltage to the inverter in each duty cycle when no receiving load is detected, and controls the input voltage of the inverter to show a gradually increasing or gradually decreasing trend during the period when there is a voltage input to the inverter. The noncontact power transfer apparatus further comprises a power receiver adapted to couple to the power transmitter as the receiving load.

As described above, according to the control method for the power transmitter, the power transmitter and the noncontact power transfer apparatus of present disclosure, the inverter in the power transmitter is controlled to be intermittently input a voltage value in the standby mode by the control circuit, and the input voltage of the inverter is controlled to show a gradually increasing or gradually decreasing trend when there is a voltage input. The control method for the power transmitter, the power transmitter and the noncontact power transfer apparatus of present disclosure have the following beneficial effects: in the first aspect, it may achieve smooth transition from the standby state to the normal state; in the second aspect, the standby loss would be reduced and the standby efficiency would be increased because the output voltage of the DC-DC converter is changeable in the standby state; in the third aspect, since the starting voltage when entering into the normal state from the standby state is a preferably suitable voltage, the system does not waste too much energy during normal operation, which results in a high operation efficiency of the system.

DETAILED DESCRIPTION OF EMBODIMENTS OF THE INVENTION

Some preferred embodiments of the present invention will be described in detail below with reference to the accompanying drawings, but the present invention is not limited thereto.

As described in the Background of the Invention, the inverter of the prior art keeps being input a constant voltage in the standby state, which renders the system fail to operate stably when entering into the normal operation state. The disclosure proposes a changeable operation mode.

Figure 1:
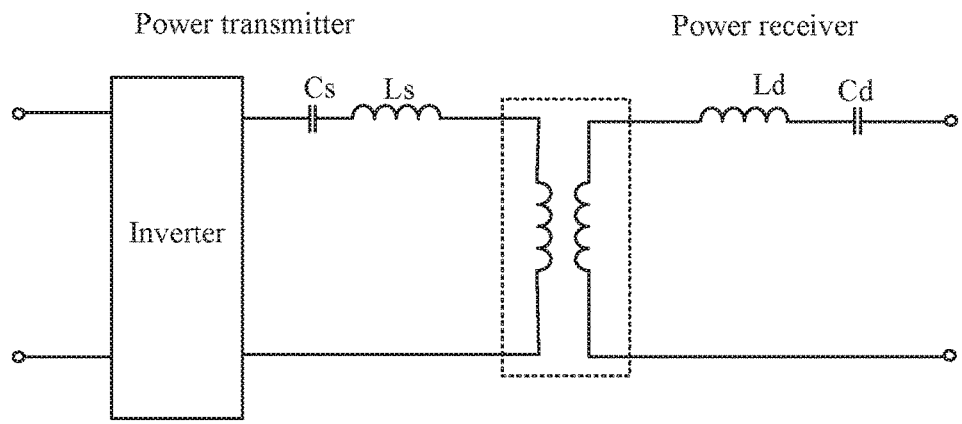
FIG. 1 is a schematic diagram of a noncontact power transfer apparatus according to the prior art.
Figure 2:
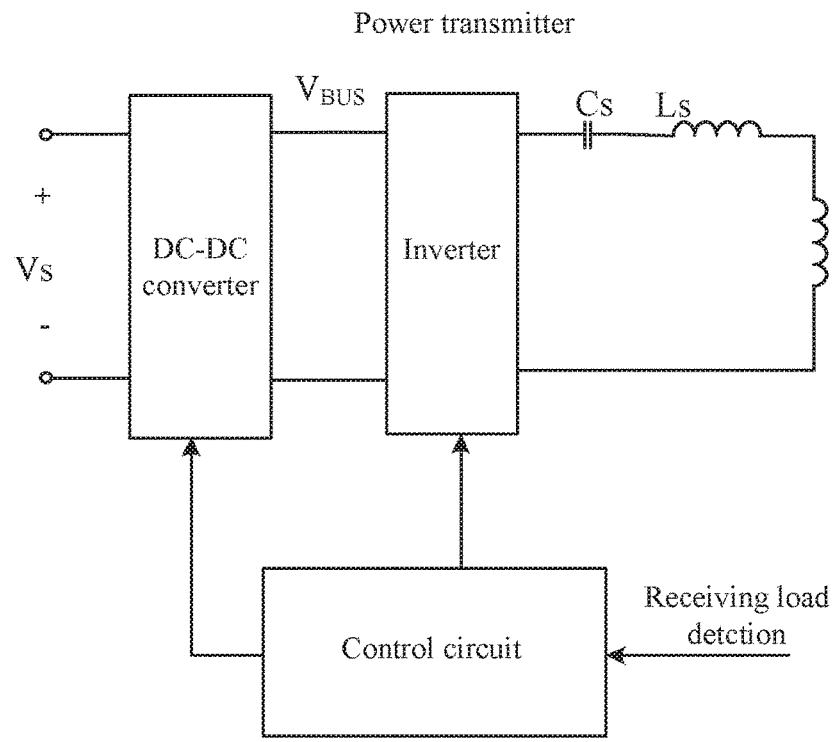
FIG. 2 is a schematic diagram of a power transmitter according to the present disclosure.

FIG. 2 shows a schematic diagram of a power transmitter according to the present disclosure, wherein the power transmitter comprises an inverter (refers to a circuit that converts a DC voltage to an AC voltage with a predetermined frequency here, the followings are the same), a primary-side resonant capacitor Cs, a primary-side transmitting coil Ls and a control circuit. In the present embodiment, an input voltage $V_{BUS}$ is supplied to the inverter through a DC-DC converter. However, those skilled in the art will appreciate that the input voltage supplying circuit for the inverter is not limited to this and may be other suitable power supply circuit such as linear voltage stabilizer. The DC-DC converter receives an external DC voltage Vs for conversion to the DC voltage $V_{BUS}$ to transmit to the inverter. The inverter receives the DC voltage $V_{BUS}$ as an input voltage and convert the input voltage to the AC power for transmission to the primary-side transmitting coil. The primary-side resonant capacitor Cs and the primary-side transmitting coil Ls resonate to generate a high-frequency spatial magnetic field. In the present embodiment, the DC-DC converter may be a suitable voltage conversion device such as a Buck converter, a Boost converter, or a Buck-Boost converter or the like. The inverter may be a full-bridge inverter circuit, a half-bridge inverter circuit or the like.

After the input end of the power transmitter is powered, the high-frequency spatial magnetic field will always exist to form an effective charging area, but there is not always a power receiver with a charging load (i.e., a receiving load) to receive the energy for charging. Therefore, when there is no power receiver coupled to the power transmitter, the operation state of the DC-DC converter or the inverter may be controlled to reduce the loss.

In the present disclosed embodiments, the control circuit detects whether a receiving load is placed in the charging area of the power transmitter. When it is detected that a receiving load is placed in the charging area, the control circuit controls the power transmitter to be in the normal operation state and then the control circuit controls to input a voltage with a predetermined value to the inverter. When it is detected that no receiving load is placed in the charging area (marked as the standby state), then the control circuit controls to intermittently input a voltage to the inverter in each duty cycle, and controls the input voltage of the inverter to show a gradually increasing or gradually decreasing trend when there is a voltage input to the inverter. In the present embodiment, the control circuit may adjust the output voltage of the DC-DC converter through an analog circuit, for example, by controlling a reference voltage value of the DC-DC converter, or may directly y control the output voltage of the DC-DC converter through a digital circuit.

Here, the operation modes of the inverter and the DC-DC converter can be flexibly controlled. When no receiving load is placed in the charging area of the power transmitter, the control circuit controls the DC-DC converter and the inverter to synchronously operate in an intermittent operation mode; or the control circuit controls the DC-DC converter to operate in the intermittent operation mode and the inverter to be kept in an continuous operation mode; or the control circuit controls the DC-DC converter to be in the continuous operation mode and the inverter to operate in the intermittent operation mode. Since the voltage output from the DC-DC converter (or the inverter) is intermittent, the power loss will not increase even if the inverter (or the DC-DC converter) is in the continuous operation mode. Of course, those skilled in the art will appreciate that the control circuit would control the inverter to be in the continuous operation mode when a receiving load is detected in the charging area.

Figure 3:
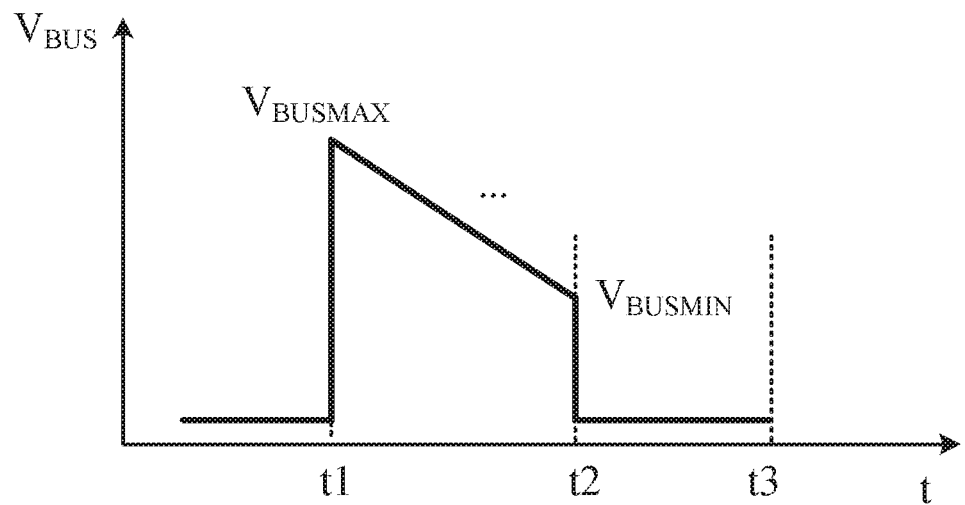
FIG. 3 is a schematic diagram of an input voltage of an inverter of a first embodiment according to the present disclosure.

Specifically, with reference to FIG. 3 that shows a schematic diagram of an input voltage of an inverter of a first embodiment according to the present disclosure. In the present embodiment, when the power transmitter operates in the standby state and there is a voltage input to the inverter, the control circuit controls the input voltage of the inverter to linearly increase or linearly decrease. For example, time t1 to t3 is one duty cycle and there is a voltage input to the inverter from time t1 to t2. The period from time t2 to t3 is sleep time during which there is no voltage input to the inverter or the input voltage tends to be zero. During the period from time t1 to t2, the input voltage of the inverter drops linearly from a maximum value $V_{BUSMAX}$ at time t1 to a minimum value $V_{BUSMIN}$ at time t2 and is thus cycled. As will be appreciated by those skilled in the art, the input voltage of the inverter may also linearly increase from the minimum value $V_{BUSMIN}$ to the maximum value $V_{BUSMAX}$.

Figure 4:
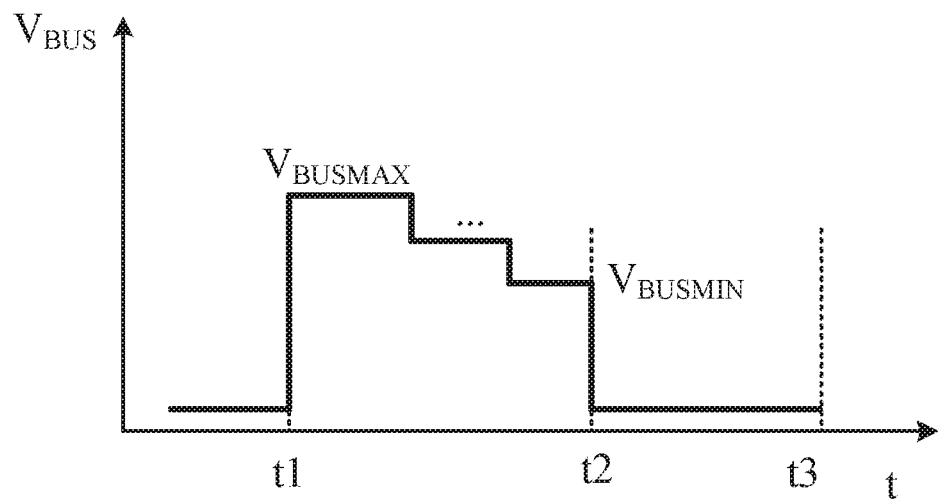
FIG. 4 is a schematic diagram of an input voltage of an inverter of a second embodiment according to the present disclosure.

With reference to FIG. 4 that shows a schematic diagram of an input voltage of an inverter of a second embodiment according to the present disclosure. In the present embodiment, when the power transmitter operates in the standby state and there is a voltage input to the inverter, the control circuit controls the input voltage of the inverter to increase in a stepped manner or decrease in a stepped manner. As shown in FIG. 4, time t1 to t3 is one duty cycle and there is a voltage input to the inverter from time t1 to t2. The period from time t2 to t3 is sleep time during which there is no voltage input to the inverter. During the period from time t1 to t2, the input voltage of the inverter drops in a stepped manner from a maximum value $V_{BUSMAX}$ at time t1 to a minimum value $V_{BUSMIN}$ at time t2 and is thus cycled. As will be appreciated by those skilled in the art, the input voltage of the inverter may also increase from the minimum value $V_{BUSMIN}$ to the maximum value $V_{BUSMAX}$ in a stepped manner. It should be noted that the stepped voltage differences by which the maximum value $V_{BUSMAX}$ sequentially decreases to the minimum value $V_{BUSMIN}$ may be the same or be different from each other.

Figure 5:
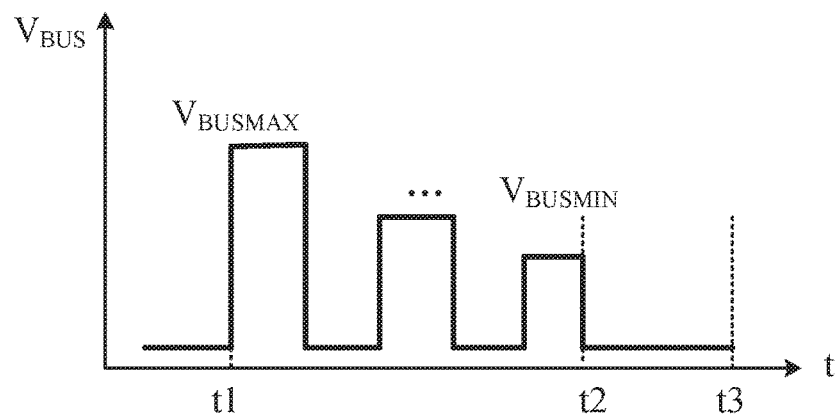
FIG. 5 is a schematic diagram of an input voltage of an inverter of a third embodiment according to the present disclosure.

FIG. 5 shows a schematic diagram of an input voltage of an inverter of a third embodiment according to the present disclosure. In the present embodiment, when the power transmitter operates in the standby state and there is a voltage input to the inverter, the control circuit controls the input voltage of the inverter to comprise voltage pulses with a plurality of sequentially increased voltage levels or voltage pulses with a plurality of sequentially decreased voltage levels. Specifically, as shown in FIG. 5, time t1 to t3 is one duty cycle and there is a voltage input to the inverter from time t1 to t2. The period from time t2 to t3 is sleep time during which there is no voltage input to the inverter. During the period from time t1 to t2, the input voltage of the inverter is controlled to be a maximum voltage value $V_{BUSMAX}$ that decreases to zero after maintaining for a period of pulse time, then the input voltage waveform has a voltage pulse with a lower voltage level that decrease to zero after maintaining for a period of pulse time, the voltage levels of the pulses sequentially decrease until decreases to a voltage pulse with a minimum voltage value $V_{BUSMIN}$ and maintaining for a period of pulse time as well, and then enters into sleep state defined by time t2-t3. Similarly, the above process may also be reversed, that is, the input voltage of the inverter is firstly controlled to be a voltage pulse with the minimum voltage value $V_{BUSMIN}$, and then gradually increases to a voltage pulse with the maximum voltage value $V_{BUSMAX}$. There is a period of time between different voltage pulses. It should be noted that the differences between the adjacent voltage levels among the plurality of voltage pulses may be the same or different and are generally configured to be the same for convenience.

Figure 6:
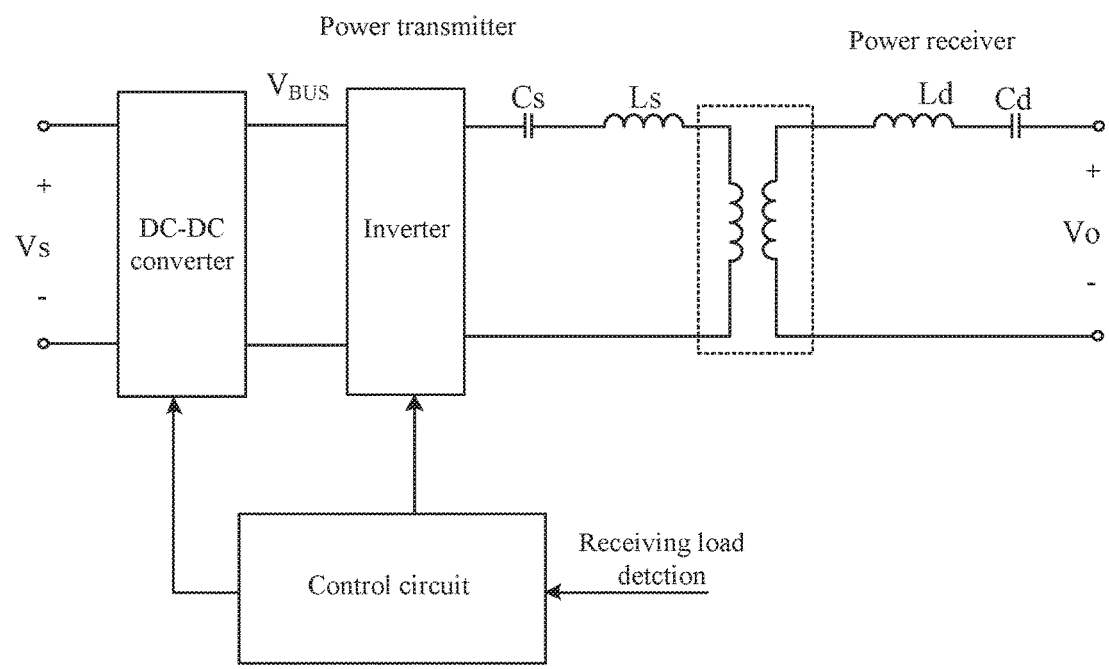
FIG. 6 is a schematic diagram of a noncontact power transfer apparatus according to the present disclosure.

With reference to FIG. 6 that shows a schematic diagram of a noncontact power transfer apparatus according to the present disclosure. The above-described power transmitter is applied in the noncontact power transfer apparatus. The noncontact power transfer apparatus further comprises a power receiver including a secondary-side resonant capacitor Cd and a secondary-side receiving coil Ld. The power receiver receives as a receiving load the magnetic energy transmitted by the power transmitter. A voltage with a predetermined value is controlled to be input to the inverter in the power transmitter when the power receiver is placed in the effective charging area of the power transmitter. When the power receiver is not placed in the effective charging area of the power transmitter, the inverter in the power transmitter is controlled to be intermittently input a voltage in each duty cycle, and when there is a voltage input to the inverter, the input voltage of the inverter is controlled to gradually increase or gradually decrease.

Figure 7:
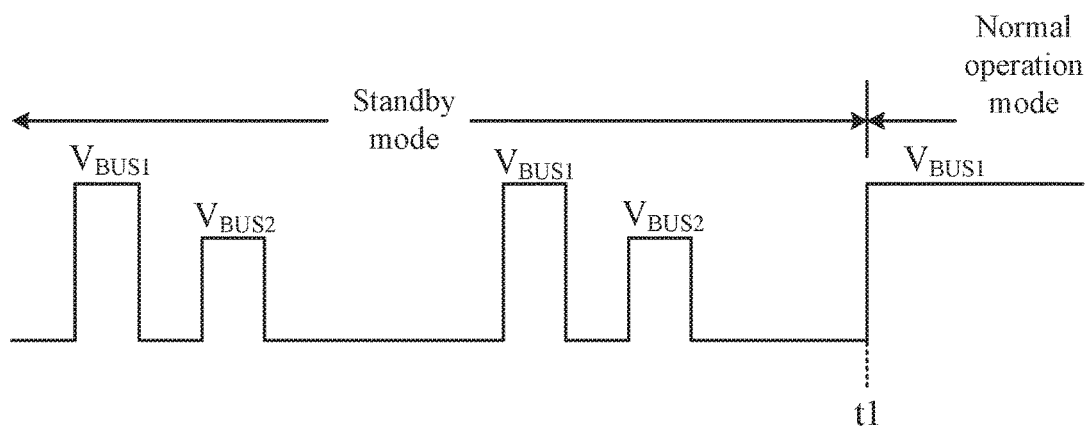
FIG. 7 shows a normal operation state starting point for a first condition of the noncontact power transfer apparatus according to the present disclosure.
Figure 8:
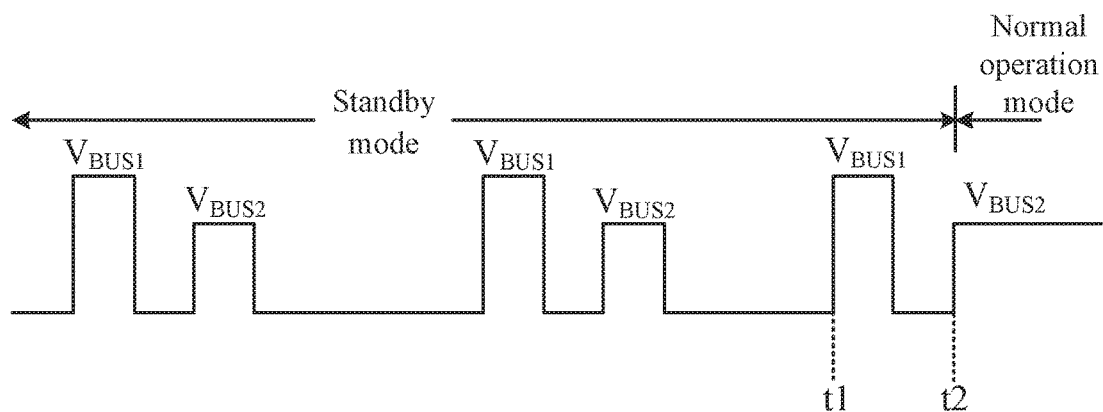
FIG. 8 shows a normal operation state starting point for a second condition of the noncontact power transfer apparatus according to the present disclosure.
Figure 9:
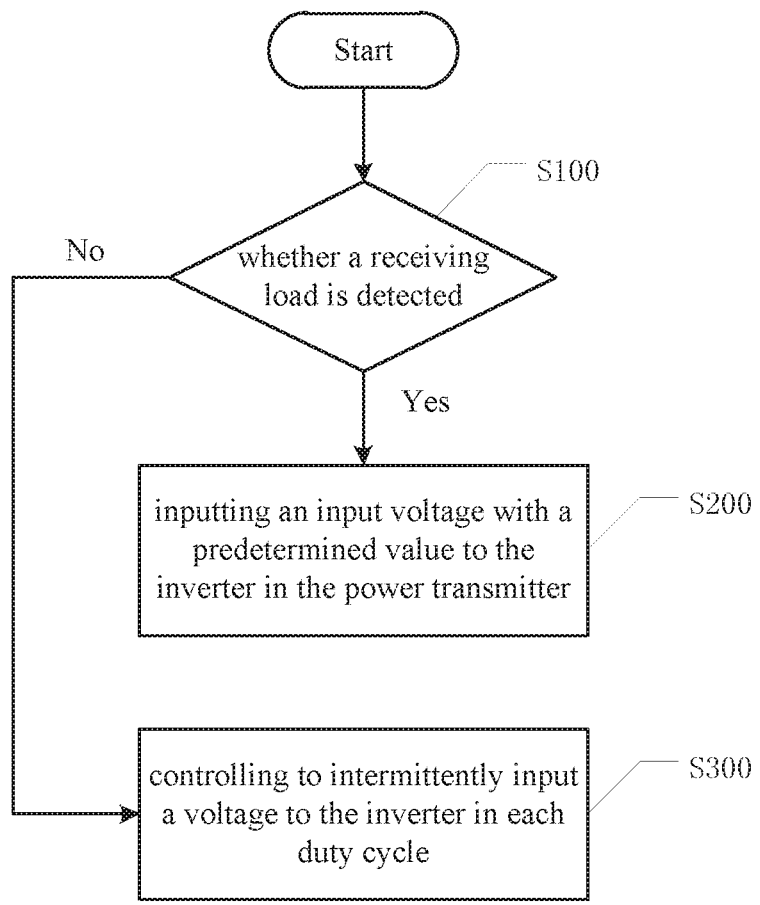
FIG. 9 is a flow diagram of the control method for the power transmitter according to the present disclosure.

The variation of the input voltage of the inverter in the condition where the power receiver is placed and is not placed in the charging area of the power transmitter is explained with reference to the voltage variation diagrams in FIGS. 7 and 8 respectively.

In the present embodiment, the input voltage with a form of a plurality of pulses, which is the waveform of the above third embodiment, is taken as an example. Here, the input voltage of the inverter having two stepped voltage levels, i.e., a higher voltage level $V_{BUS1}$ and a lower voltage level $V_{BUS2}$, is described as an example. It is easy for those skilled in the art to understand that the magnetic field around the primary-side transmitting coil correspondingly becomes stronger when the input voltage level is $V_{BUS1}$ and the magnetic field around the primary-side transmitting coil correspondingly becomes weaker when the input voltage level is $V_{BUS2}$. When the power receiver is placed in the effective charging area of the power transmitter but the position of the power receiver is partial and the magnetic field coupling is weak, the secondary-side receiving coil needs to be coupled to a required voltage level under a strong spatial magnetic field. If the input voltage of the inverter is the lower voltage level $V_{BUS2}$ at this time, the power receiver will not be recognized and the system cannot enter into the normal operation state. As shown in FIG. 7, the system would switch to the normal operation state and operate continually until the input voltage of the inverter changes to the higher voltage level $V_{BUS1}$, such as at t1 time.

In the other case, when the power receiver is placed in the effective charging area of the power transmitter and the position correspondence is good and the magnetic field coupling is strong, if the voltage level input to the inverter is $V_{BUS1}$ at this time, the spatial magnetic field of the power transmitter is strong and the power receiver is over-voltage protected and cannot operate normally. As time t1 shown in FIG. 8, the system is in an over-voltage state. During the following time, the input voltage input to the inverter would decrease, for example, decrease from the high voltage level $V_{BUS1}$ to the low voltage level $V_{BUS2}$, and reduce the strength of the spatial magnetic field of the power transmitter at time t2 so as to decrease the voltage generated by the power receiver through coupling and make the power receiver switch to the normal operation state.

As can be seen from the above process, by adopting the technical solution of the present disclosure, the voltage input to the inverter is changeable in the standby state in a manner of changing from a low level to a high level or from a high level to a low level. Compared with inputting a constant voltage all the time as prior art, the loss in the standby state may be reduced and the efficiency may be improved. On the other hand, according to the technical solution of the present invention, it is possible to switch to the normal operation state from the standby state conveniently y without being stuck in the situation of overvoltage or insufficient induced voltage, so that the system may be switched freely among different states.

The input voltage with two different voltage levels is described above as an example. It will be appreciated by those skilled in the art that more $V_{BUS}$ voltage levels may be set so as to make the power receiver be recognized in different positions. For example, when the power receiver is placed at a position where the magnetic field coupling is weak, the power transmitter is required to provide a strong magnetic field and the circuit in the power receiver operates normally when the input voltage of the inverter is $V_{BUS1}$. At the position where the magnetic field coupling is good, the power receiver may be in the overvoltage state when input voltage of the inverter is at higher voltage level $V_{BUS1}$ and $V_{BUS2}$ and can operate normally and continually at a lower voltage level $V_{BUS3}$. While at the position where the magnetic field coupling condition is middle-ranked, the power receiver can operate continually when the input voltage of the inverter is at a middle voltage level $V_{BUS2}$. It thus can be inferred that the voltage levels for the system switch to the normal operation state are all most appropriate, and it will neither generate a too strong magnetic field nor a too weak magnetic field. Therefore, compared to inputting a constant voltage value in the prior art, the operation efficiency of the system according to the technical solution of the present disclosure may be improved.

As for the linear change in the first embodiment and the stepped change in the second embodiment of the input voltage of the inverter, they can both operate in accordance with the operation mode in the third embodiment and can also achieve the same technical effect, which is not introduced one by one here.

Finally, the present disclosure discloses a control method for a power transmitter, the control method comprising following steps: step S100, determining whether a receiving load is detected, if so, turning to step S200, if not, turning to step S300; step S200, inputting an input voltage with a predetermined value to an inverter in the power transmitter when a receiving load is detected; and step S300, controlling to intermittently input a voltage to the inverter in each duty cycle when no receiving load is detected, and controlling the input voltage of the inverter to show a gradually increasing or gradually decreasing trend during the period when there is a voltage input to the inverter.

Preferably, the input voltage of the inverter is controlled to linearly increase or linearly decrease during the period when there is a voltage input to the inverter.

Preferably, the input voltage of the inverter is controlled to increase in a stepped form or decrease in a stepped form during the period when there is a voltage input to the inverter.

Preferably, the input voltage of the inverter includes a plurality of different voltage values during the period when there is a voltage input to the inverter, the plurality of different voltage values shows a pulse shape of being sequentially increased or a pulse shape of being sequentially decreased.

The control method for the power transmitter, the power transmitter and the noncontact power transmission device according to the preferred embodiments of the present invention have been described in detail above, but the circuits and the beneficial effects of the patent shall not be considered to be limited to those as stated above, the disclosed embodiments and the accompany drawings can make a better understanding of the present invention. Thus, the contents of the above-disclosed embodiments and the accompany drawings of the description are intend to make a better understanding of the present invention, and the protection scope of the present invention is not limited to the present disclosure. The modifications and variations to the embodiments of the present invention by those skilled in the art are all within the protection scope of the present invention.

We claim:

1. A control method for a power transmitter, comprising:
at the power transmitter comprising an inverter and a primary-side circuit, the primary-side circuit being configured to generate a spatial magnetic field in a charging area in response to an AC voltage outputted by the inverter:
inputting a first voltage with a predetermined value to the inverter in a first time period, wherein a receiving load is detected in the charging area in the first time period; and
intermittently inputting a second voltage to the inverter in a second time period, wherein no receiving load is detected in the charging area in the second time period,
wherein the second time period comprises a plurality of sub-periods, and the second voltage has a gradually increasing or gradually decreasing trend in each of the plurality of sub-periods.

2. The control method as claimed in claim 1, wherein the second voltage linearly increases or decreases from a first value to a second value in each of the plurality of sub-periods.

3. The control method as claimed in claim 1, wherein the second voltage increases or decreases from a first value to a second value via multiple steps in each of the plurality of sub-periods.

4. The control method as claimed in claim 1, wherein the second voltage is a plurality of pluses in each of the plurality of sub-periods, and amplitudes of the plurality of pluses increase or decrease successively.

5. A power transmitter comprising:
an inverter;
an input voltage supplying circuit;
a primary-side circuit configured to generate a spatial magnetic field in a charging area in response to an AC voltage outputted by the inverter; and
a control circuit for detecting whether a receiving load is in the charging area,
wherein the input voltage supplying circuit is configured to output a first voltage with a predetermined value to the inverter when the control circuit detects that the receiving load is in the charging area, and to intermittently output a second voltage to the inverter when the control circuit detects that the receiving load is not in the charging area,
wherein the second voltage has a gradually increasing or gradually decreasing trend in each of a plurality of sub-periods in which the receiving load is not in the charging area.

6. The power transmitter as claimed in claim 5, wherein the second voltage linearly increases or decreases from a first value to a second value in each of the plurality of sub-periods.

7. The power transmitter as claimed in claim 5, wherein the second voltage increases or decreases from a first value to a second value via multiple steps in each of the plurality of sub-periods.

8. The power transmitter as claimed in claim 5, wherein the second voltage is a plurality of pluses in each of the plurality of sub-periods, and amplitudes of the plurality of pluses increase or decrease successively.

9. The power transmitter as claimed in claim 5, wherein the input voltage supplying circuit is a DC-DC converter, and an output voltage of the DC-DC converter is controlled by the control circuit.

10. The power transmitter as claimed in claim 9, wherein the control circuit is configured to control the DC-DC converter and the inverter to synchronously operate in an intermittent operation mode when no receiving load is detected.

11. The power transmitter as claimed in claim 9, wherein the control circuit is configured to control the DC-DC converter to operate in an intermittent operation mode and simultaneously control the inverter to be kept in a continuous operation mode when no receiving load is detected.

12. The power transmitter as claimed in claim 9, wherein the control circuit is configured to control the DC-DC converter to be kept in a continuous operation mode and simultaneously control the inverter to operate in an intermittent operation mode when no receiving load is detected.

13. A noncontact power transfer apparatus comprising: a power transmitter and a power receiving terminal, wherein the power transmitter comprises:

an inverter;

an input voltage supplying circuit;

a primary-side circuit configured to generate a spatial magnetic field in a charging area in response to an AC voltage outputted by the inverter; and a control circuit for detecting whether the power receiving terminal is in the charging area, wherein the input voltage supplying circuit is configured to output a first voltage with a predetermined value to the inverter when the control circuit detects that the power receiving terminal is in the charging area, and to intermittently output a second voltage to the inverter when the control circuit detects that the power receiving terminal is not in the charging area, wherein the second voltage has a gradually increasing or gradually decreasing trend in each of a plurality of sub-periods in which the power receiving terminal is not in the charging area.

14. The noncontact power transfer apparatus as claimed in claim 13, the second voltage linearly increases or decreases from a first value to a second value in each of the plurality of sub-periods.

15. The noncontact power transmission apparatus as claimed in claim 13, the second voltage increases or decreases from a first value to a second value via multiple steps in each of the plurality of sub-periods.

16. The noncontact power transfer apparatus as claimed in claim 13, wherein the second voltage is a plurality of pluses in each of the plurality of sub-periods, and amplitudes of the plurality of pluses increase or decrease successively.

17. The noncontact power transfer apparatus as claimed in claim 13, wherein the input voltage supplying circuit is a DC-DC converter, and an output voltage of the DC-DC converter is controlled by the control circuit.

18. The noncontact power transfer apparatus as claimed in claim 17, wherein the control circuit is configured to control the DC-DC converter and the inverter to synchronously operate in an intermittent operation mode when no receiving load is detected.

19. The noncontact power transfer apparatus as claimed in claim 17, wherein the control circuit is configured to control the DC-DC converter to operate in an intermittent operation mode and simultaneously control the inverter to be kept in a continuous operation mode when no receiving load is detected.

20. The noncontact power transfer apparatus as claimed in claim 17, wherein the control circuit is configured to control the DC-DC converter to be kept in a continuous operation mode and simultaneously control the inverter to operate in an intermittent operation mode when no receiving load is detected.

* * * * *